(12) United States Patent
Schwartz et al.

(10) Patent No.: US 11,204,596 B2
(45) Date of Patent: Dec. 21, 2021

(54) TOOL TRACKING AND DATA COLLECTION ASSEMBLY

(71) Applicant: WILSON TOOL INTERNATIONAL INC., White Bear Lake, MN (US)

(72) Inventors: Anthony David Schwartz, Forest Lake, MN (US); John H. Morehead, White Bear Lake, MN (US); Brian J. Lee, Elk River, MN (US); Jon M. Shimota, Stillwater, MN (US); Richard L. Timp, Vadnais Heights, MN (US); Bryan L. Rogers, Forest Lake, MN (US); Kevin A. Johnston, Deer Park, WI (US)

(73) Assignee: WILSON TOOL INTERNATIONAL INC., White Bear Lake, MN (US)

( * ) Notice: Subject to any disclaimer, the term of this patent is extended or adjusted under 35 U.S.C. 154(b) by 58 days.

(21) Appl. No.: 16/398,219

(22) Filed: Apr. 29, 2019

(65) Prior Publication Data
US 2019/0332088 A1    Oct. 31, 2019

Related U.S. Application Data

(60) Provisional application No. 62/664,936, filed on Apr. 30, 2018.

(51) Int. Cl.
 *G06M 1/27*      (2006.01)
 *G05B 19/406*   (2006.01)
 *G06K 7/10*      (2006.01)

(52) U.S. Cl.
 CPC ....... *G05B 19/406* (2013.01); *G06K 7/10297* (2013.01); *G05B 2219/45137* (2013.01); *G06K 2007/10504* (2013.01)

(58) Field of Classification Search
 CPC .. G06K 2007/10504; G06K 7/00; G06M 1/27
 See application file for complete search history.

(56) References Cited

U.S. PATENT DOCUMENTS

| 5,485,646 A | * | 1/1996 | Merritt | ............... | A46B 15/0002 |
| | | | | | 15/105 |
| 2009/0084568 A1 | * | 4/2009 | Arimura | ............. | B25B 23/1405 |
| | | | | | 173/104 |
| 2018/0361551 A1 | * | 12/2018 | Hartmann | ............ | B25D 11/125 |

FOREIGN PATENT DOCUMENTS

| DE | 102011011824 A1 | 8/2012 |
| EP | 0726129 A2 | 8/1996 |
| EP | 1048450 A2 | 11/2000 |
| WO | 2012162014 A1 | 11/2012 |

OTHER PUBLICATIONS

International Patent Application No. PCT/US2019/029752, International Search Report and Written Opinion dated Jul. 30, 2019, 14 pages.

* cited by examiner

*Primary Examiner* — Eric S. McCall
(74) *Attorney, Agent, or Firm* — Fredrikson & Byron, P.A.

(57) ABSTRACT

Tooling and corresponding tool assembly configurations equipped with exemplary designs of tracking assemblies configured to track information, such as use history, and perform a variety of processing and storage functions relative to the same for more efficient use and maintenance of the tooling over their lifetimes. The tracking assemblies can have retrofit-ready constructions.

20 Claims, 14 Drawing Sheets

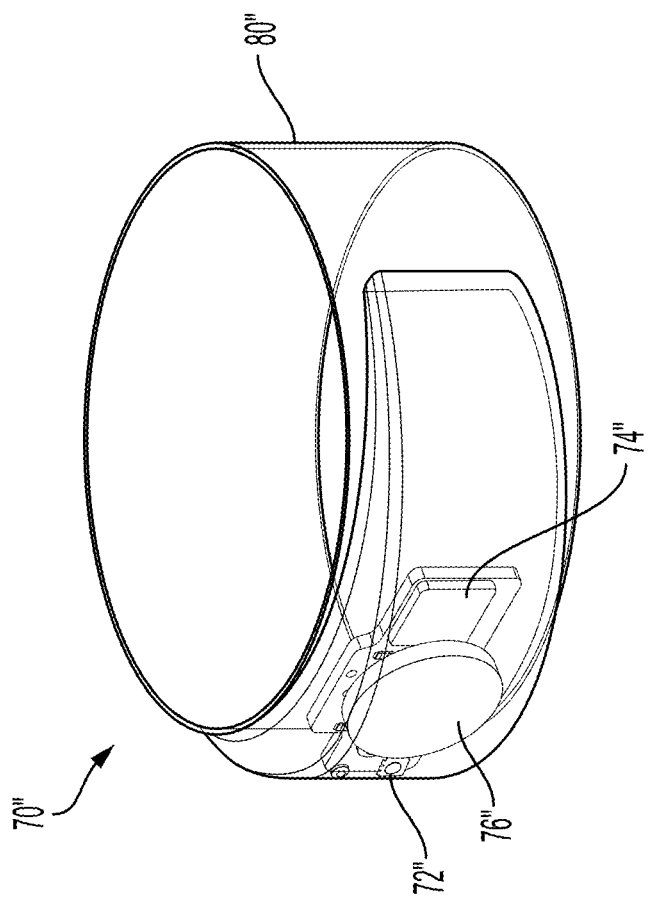
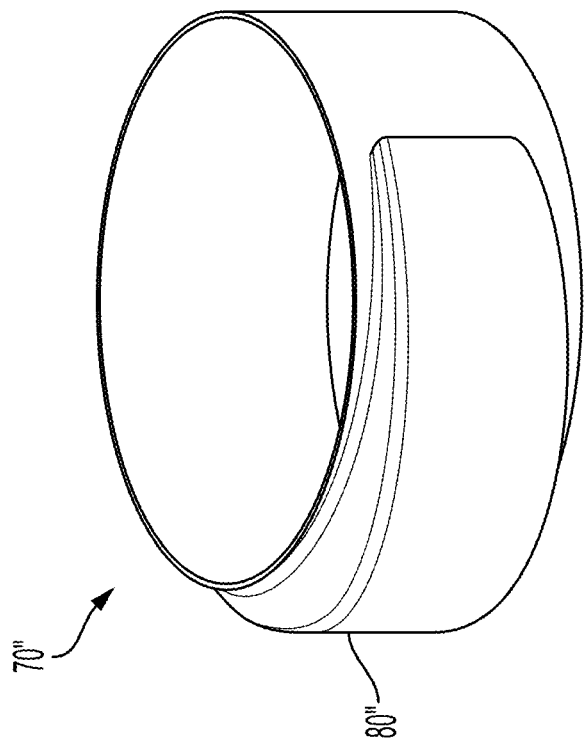
FIG. 6B
FIG. 6A

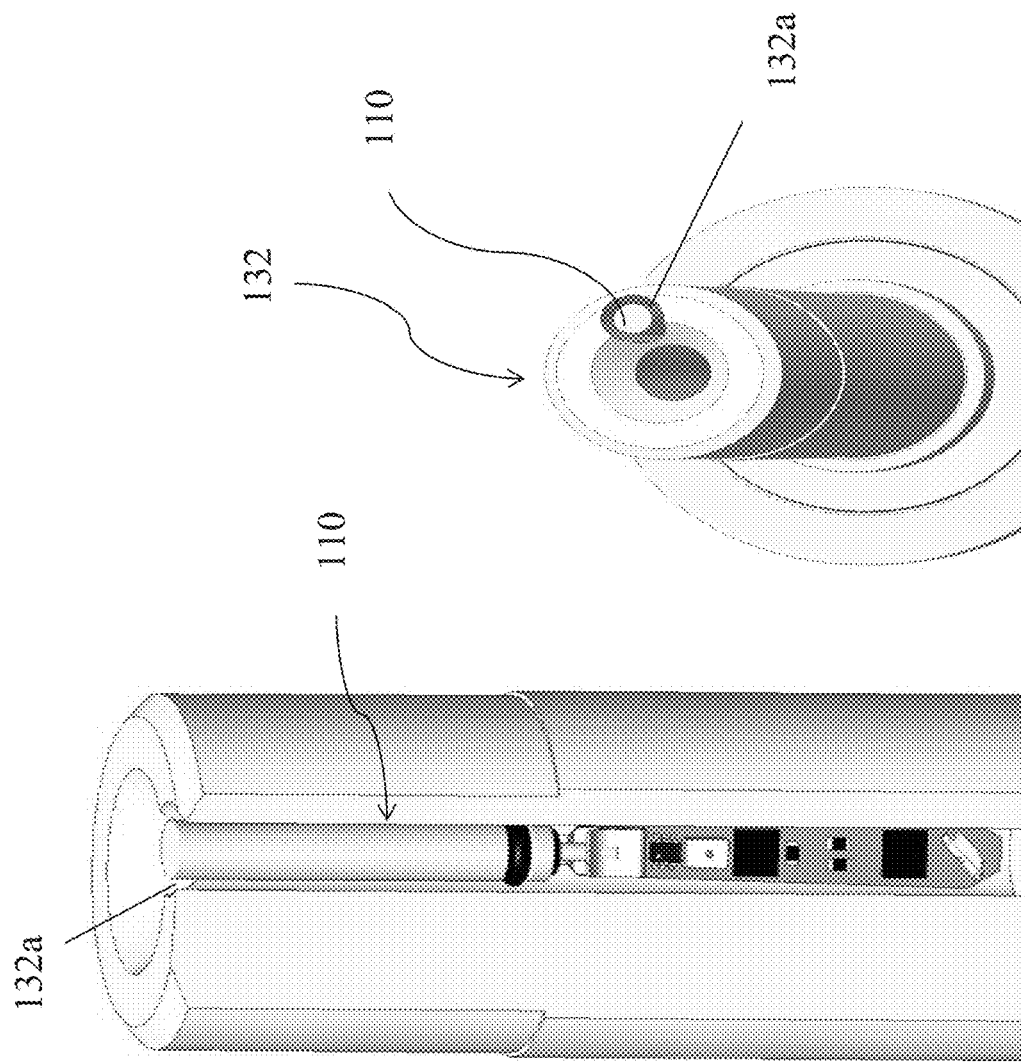
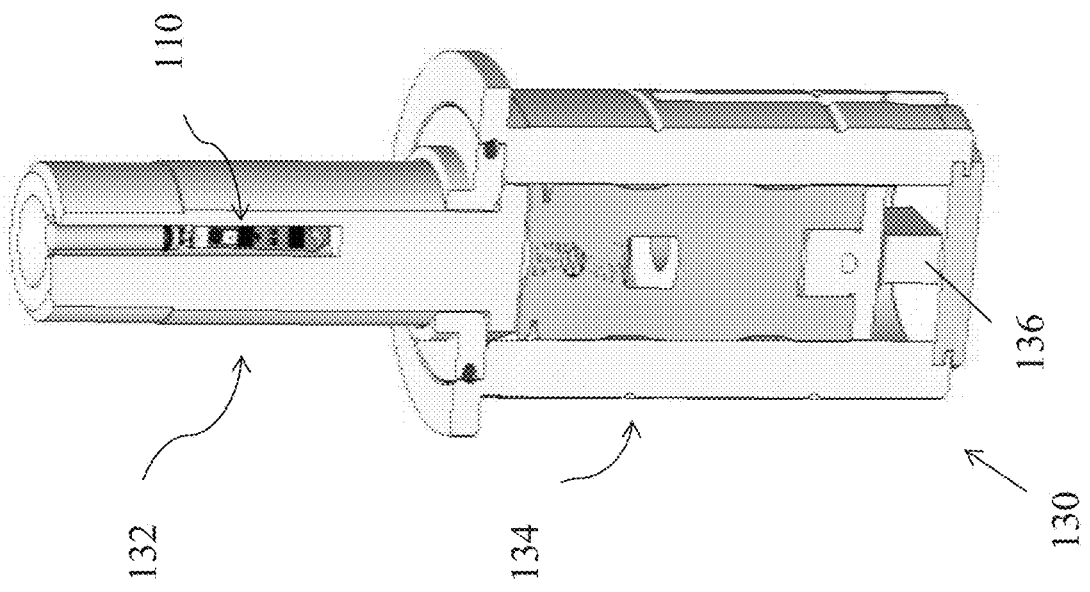
FIG. 10A  FIG. 10B  FIG. 10C

TOOL TRACKING AND DATA COLLECTION ASSEMBLY

RELATED MATTERS

This application claims the benefit of U.S. Provisional Patent Application No. 62/664,936 filed Apr. 30, 2018. The entire content of this application is incorporated herein by reference.

FIELD OF THE INVENTION

The present invention generally relates to tools and tool assemblies which can be used in industrial machines. More particularly, the invention relates to assemblies for such tools and tool assemblies, which are configured to hold or track data pertinent to the tools and/or assemblies.

BACKGROUND

Punch presses are typically configured to hold a plurality of tools for forming a variety of shapes and sizes of indentations and/or holes in sheet workpieces, for example, sheet metal. Tools of this sort commonly include at least one punch assembly and corresponding die. For example, in a multiple station turret punch press, a rotatable turret includes a plurality of bores, which hold a corresponding plurality of punch assemblies above a workpiece support surface, and a corresponding plurality of die receiving frames are located below the workpiece support surface. Alternatively, in other presses (such as Trumpf style presses), a rail (instead of a turret) is used for holding the punch assemblies.

A conventional punch assembly typically includes a punch body or holder and a punch, and can further include a punch guide. The punch may be either fixedly or releasably attached to the holder, while the punch holder and punch are often slidably engaged within a punch guide for reciprocal, axial movement along a central longitudinal axis of the punch guide. When such a punch assembly, and a corresponding die, are mounted in a press and located in a working position of the press, beneath the ram (or integrally connected to the ram), the punch is driven out from the punch guide, through an opening in a stripper plate, in order to form an indentation or a hole through a sheet workpiece with the tip of the punch. The stripper plate, which is attached to an end of the punch guide, prevents the workpiece from following the punch, upon its retraction back into the punch guide.

Press brakes, on the other hand, are commonly equipped with a lower table and an upper table; one of which, often the upper table, is vertically movable toward the other table. Forming tools are mounted to the tables so that when the tables are brought together, a workpiece between the forming tables is bent into an appropriate shape. It is common for the upper table to include a male forming tool having a bottom workpiece-deforming surface (usually V shaped), and for the bottom table to have a correspondingly-shaped die. An upper surface of the die is vertically aligned with the workpiece-deforming surface of the tool so that, when the tool and die are brought together, a workpiece between the two is pressed by the forming tool into the die and thereby bent into a corresponding shape.

It often is necessary to exchange forming tools and dies when a different punching or bending operation is to be performed. For example, in the case of press brakes, the forming tools are designed to be readily removed and exchanged for others. Likewise, it is customary for tools to be moved from machine to machine as is warranted. Consequently, when the tools are used in manufacturing facilities or multi-building facilities, any particular tool, when used and rotated between different machines, can often be difficult to locate, and the search for such tool can be a time-consuming task. Thus, a means to easily locate/track and identify a tool that is used in multiple machines would be of value.

Similar to punch tools used in turret or single station punch machines, a variety of tools can be used with stamping presses, and involve punching holes in, or forming, a piece of sheet metal, often via progressive stamping operations. These stamping applications dictate at least one punch or punch assembly and corresponding die being used. For each operation, a stamping tool is used in acting on the workpiece to perform the desired processing, whereby the tool is releasably held by a retainer or secured to a die shoe (e.g., as part of a die set) of the stamping system.

In many cases, it is desirable to act on a workpiece at multiple locations, e.g., simultaneously, subsequently, or both. For example, it may be desirable to punch a number of different holes at different spots on the workpiece (e.g., a piece of sheet metal). To accomplish this, a number of punches can be secured to one of the upper or lower die shoes at different locations either via a retainer or direct attachment to the die shoe, with dies attached to the opposite die shoe. The die shoe carrying the stamping tools or dies is then moved toward the sheet metal to cause the individual tools carried by the retainers or attached directly to the die shoe to simultaneously act on the sheet metal. As is well known, in some cases, a single retainer (i.e., a multiple position retainer) can be used to hold multiple stamping tools.

Similar to punches and dies used with punch, press brake, and stamping machines in sheet metal processing, tooling is used with compression machines. For tablet fabrication, such tooling is used for compressing medicine, candy, or non-edible items (such as batteries and cleaning agents) into tablets. Particularly, a powder or granule mixture is prepared, a die mold is filled therewith, and then the mixture is compressed to desired shape of the tablet, where after the tablet is ejected. Unlike drug tablets, which are constrained to shapes that can be easily swallowed, candy tablets (being chewable) and non-edible tablets can take various shapes and sizes.

Continuing with the above, tablets are formed by compressing the granules in the die mold with a lower punch and an upper punch, with the tablet being formed via the combined pressing action of the two punches (lower and upper) relative to the die. In such tablet compression machine, the main principle involves compressing of the upper and lower punch in a die hole, whereby the underlying applied force/pressure plays a key role and is transmitted unreduced through static fluid motion. The pressure/force can be generated in a variety of ways, such as via mechanical or hydraulic means. To that end, by increasing the pressure, the compressing force is correspondingly increased, such that the formed tablet is correspondingly hardened. As such, tablet fabrication via compression process can be divided into four distinct stages, namely filling (of the powder or granule in the die mold), metering (of the amount of powder/granule used in the mold), compressing (via upper and lower punches relative to the powder/granule in the die mold to form the tablet), and ejection (of the formed tablet).

Those skilled in the art appreciate that tools used in punch presses, press brakes, stamping presses and compression presses require regular maintenance and modification. To that end, the tools are often configured to be readily removable from the presses so as to allow for such maintenance/modification. For example, with respect to punches, they may need to be sharpened, polished or replaced when becoming worn. Alternatively, the punches may need to be switched out from the press when, depending on the machining operation, a different punch shape (or footprint) is required. In each of these scenarios, if removed from the press, a punch can be difficult to track, not only with respect to its use history, e.g., hit/stroke count, but also its very location.

In particular, information concerning machining or compression tools (punches or dies), e.g., relating to use history, can be quite valuable to the machine operator, particularly in saving time and money (e.g., in being able to plan for maintenance and/or ordering of new punches for effective machining or tableting operations, or simply for locating the whereabouts of a tool needed for a job). Moreover, in the case of tablet manufacture, the traceability of tooling may be required by law or regulation. A variety of presses have been designed to track the individual hit/stroke count of each tool while in the presses; however, there remains a need for configurations in which information relating to the tools can continue to be tracked, particularly after their removal from presses, prior to and subsequent use in the same or other presses.

SUMMARY OF THE INVENTION

In certain embodiments of the invention, a method of monitoring use history of a tool assembly is provided. The method comprises the steps of providing a tool assembly and an assembly for tracking a hit or stroke count for the tool assembly when installed in a punching, bending, stamping, or compression press. The tool assembly comprises a tool, either a punch or a die. The tracking assembly is operably coupled to the tool assembly and comprises a counter. Further step of the method includes applying a force relative to the tool assembly, resulting in the tool being used for a machining operation, the force providing a corresponding force on the tracking assembly, wherein said corresponding force on the tracking assembly results in the counter to increase by single iteration.

In other embodiments of the invention, a tracking assembly for use with a tool assembly is provided. The tracking assembly includes a body formed in a shape of a collar. The collar is sized so as to be wrapped about a portion of the tool assembly. The tracking assembly also includes one or more electronic devices operably coupled to the collar. The devices include a sensor and a counter that are in electrical communication. The sensor is triggered from a force applied to the body, with an output from the sensor serving as a trigger for the counter to increase by single iteration.

In further embodiments of the invention, a tracking assembly for use in combination with a tool assembly is provided. The tool assembly comprises a tool, either a punch or a die. The tracking assembly comprises a body and includes one or more electronic devices operably coupled to the body. The devices include a sensor and a counter that are in electrical communication. The sensor is triggered from a force applied to the tool for performance of a machining operation therewith, with corresponding output from the sensor serving as a trigger for the counter to increase by single iteration.

In additional embodiments of the invention, a tracking assembly is provided, for use with one of a tool or a tool assembly. The tracking assembly includes a body formed in a shape of an elongated tray. The tray is sized so as to be embedded within the tool or tool assembly. The tracking assembly also includes one or more electronic devices operably coupled to the tray. The devices include a sensor and a counter that are in electrical communication. The sensor is triggered from a force applied to the tool or tool assembly for performance of a machining operation, with corresponding output from the sensor serving as a trigger for the counter to increase by single iteration.

DESCRIPTION OF THE DRAWINGS

The following drawings are illustrative of particular embodiments of the present invention and therefore do not limit the scope of the invention. The drawings should not be presumed as being to scale (unless so stated) and are intended for use in conjunction with the explanations in the following detailed description. Embodiments of the present invention will hereinafter be described in conjunction with the appended drawings, wherein like numerals denote like elements.

FIGS. 6A and 6B are perspective views of a further exemplary tracking assembly with sheathed configuration for use with a punch assembly, respectively shown with sheath in solid and translucent representations, in accordance with certain embodiments of the invention.

FIGS. 10A, 10B, and 10C are side perspective views and top perspective view of the tracking assembly of FIGS. 8A and 8B used with a punch assembly in accordance with certain embodiments of the invention.

DETAILED DESCRIPTION

Figure 1A:
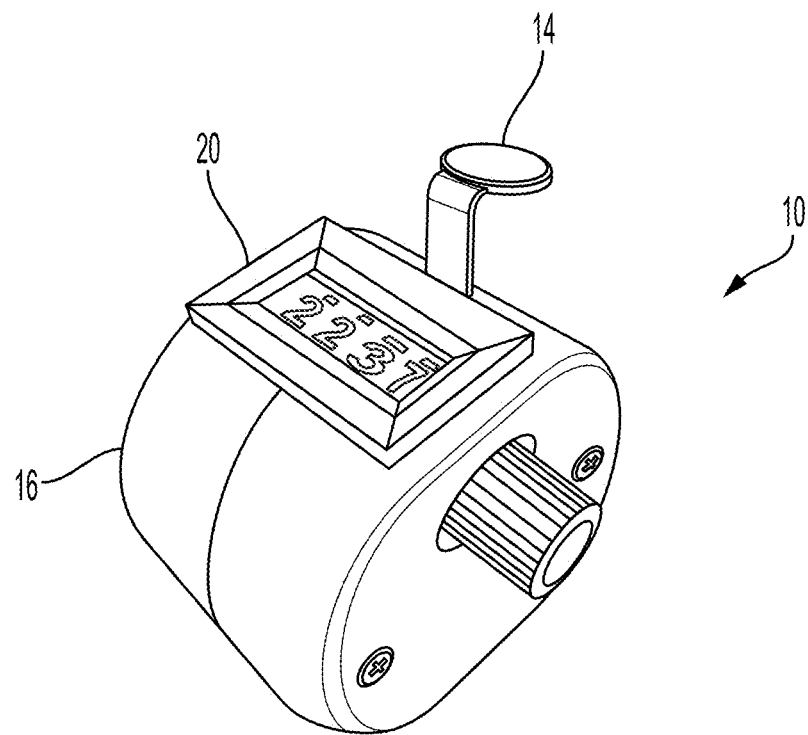
FIGS. 1A and 1B are perspective views of an exemplary tracking assembly for use with a punch assembly, respectively shown in assembled and disassembled representations, in accordance with certain embodiments of the invention.

The following detailed description should be read with reference to the drawings, in which like elements in different drawings are numbered identically. The drawings depict selected embodiments and are not intended to limit the scope of the invention. It will be understood that embodiments shown in the drawings and described below are merely for illustrative purposes, and are not intended to limit the scope of the invention as defined in the claims.

As described above, a conventional punch assembly includes at least a punch body or holder and a punch, wherein the punch can be either fixedly or releasably attached to the punch holder, and wherein the assembly can further include a punch guide. As will be appreciated from the following description, certain embodiments are detailed relative to exemplary designs of tracking assemblies for use with punch assemblies. However, the invention should not be so limited. Particularly, it should be appreciated that the described embodiments are just as applicable to any tooling (e.g., punches, dies, etc.). Moreover, while the embodiments described herein reference/depict punch assemblies generally usable with turret press machines, aspects from such are also applicable to punch assemblies used with other industrial machines (for use in bending, stamping, or compression) as well as to die assemblies therefor. Furthermore, while initial focus is directed to their tracking functionality, in certain embodiments, the assemblies can have other functionality, including one or more of storage, dissemination, and transmission of information relative to their corresponding punch assemblies and/or use thereof.

Continuing with the above, a further object of the tracking assemblies embodied herein is to be applicable with new tooling as well as existing tooling, with the tracking assemblies having retrofit-ready constructions. An underlying object is for the tooling, so equipped with the embodied tracking assemblies, to not be adversely affected during their normal use within their intended presses, or put another way, for the tracking assemblies to not interfere with conventional use of the tooling. Likewise, a further underlying object is for the embodied tracking assemblies to properly function over the lifetimes of the tooling, or put another way, for the tracking assemblies to not be adversely affected by the conventional use of the tooling within their intended machines.

Regardless of the underlying type of industrial machines (such as presses for one or more of forming, punching, stamping, or compressing), the tracking assemblies embodied herein are configured to track a variety of data relative to historical use of the corresponding tooling used therewith, or the tooling's "use history." For example, relative to a punch press and punch assembly used therewith, such "use history" can include the "hit/stroke count," or more specifically the quantity of times the punch assembly, and punch tip thereof, has been acted upon (e.g., by a ram during machining processes) during its life. Continuing with a punch assembly example, the "use history" can be used to forecast "sharpening life," or more specifically the quantity of times the punch assembly, and punch therefor, can be acted upon before requiring maintenance (e.g., punch tip sharpening). It should be appreciated that a variety of information can be tracked and delineated to enhance use and lifetime of the tooling. For example, depending on the sophistication of the underlying tracking mechanism used with the assembly, other tracked variables can include particular dates/periods of use of the punch assembly, the differing machines within which the punch assembly is used, the machine applications conducted with the punch assembly, etc. Moreover, the tracking assemblies, in certain embodiments, can be configured to disseminate the data collected from the punch assemblies via processing means (e.g., microprocessor) included with the tracking assemblies.

Moreover, the tracking assemblies embodied herein, in certain embodiments, are equipped with means to transmit the information held by and relating to the corresponding tooling. Such information can be stored within the tracking assembly when manufactured (pre-use) for identification purposes, or can be tracked/collected by the assembly (during use). To that end, the information tracked/collected, in certain embodiments, can be disseminated via the tracking assembly prior to its storage within or transmission from the tooling. Such transmission of the tracking assemblies, in certain embodiments, can be made locally through mesh networks, intranets, direct visualization and local area networks or worldwide via cloud services whether the information is electronic or static, for use by the operator, or manufacturer to obtain valuable data on usage, condition, function, and location.

In the industry, with the growing reliance by manufacturing on technology such as Industry 4.0 and the Internet relative to real-time operations management, automated supply chain replenishment and immediate logistics data have necessitated the continued evolution of technologies such as Bluetooth Low Energy (BLE), mesh networks, and cloud services connected to multiple device types and apps. Particularly, BLE technologies provide significant benefits over traditional tracking technologies such as RFID. To that end, in certain embodiments, devices (e.g., BLE or Blue Tooth) are mounted (permanently or semi-permanently) on or within the tracking assemblies, or the corresponding tooling, so as to continuously record and broadcast data back to a cloud service via Wi-Fi or cellular data. Moreover, in certain embodiments, such information can be compiled for or by regulatory agencies, to determine where a tool was in use, e.g., in event of a safety issue.

With the above objects serving as a backdrop, attention is shifted to exemplary tracking assemblies in accordance with certain embodiments of the invention. There are a variety of differing mechanisms that can be used to track "use history," depending on the underlying information that is being tracked. At a base line, keeping track of "hit/stroke count" of the punch assembly over its life is but one piece of information that would be invaluable for the machine operator to reference over time. To that end (and as noted above), a difficulty has been keeping track of such "hit/stroke count"

when the punch assembly is removed from the press machine, and then is subsequently used in the same machine or others. To that end, initial focus has been on providing a tracking assembly that can be moved with the punch assembly (when removed from the press machine) so as to continue tracking its "hit/stroke count" during future use.

Figure 1B:
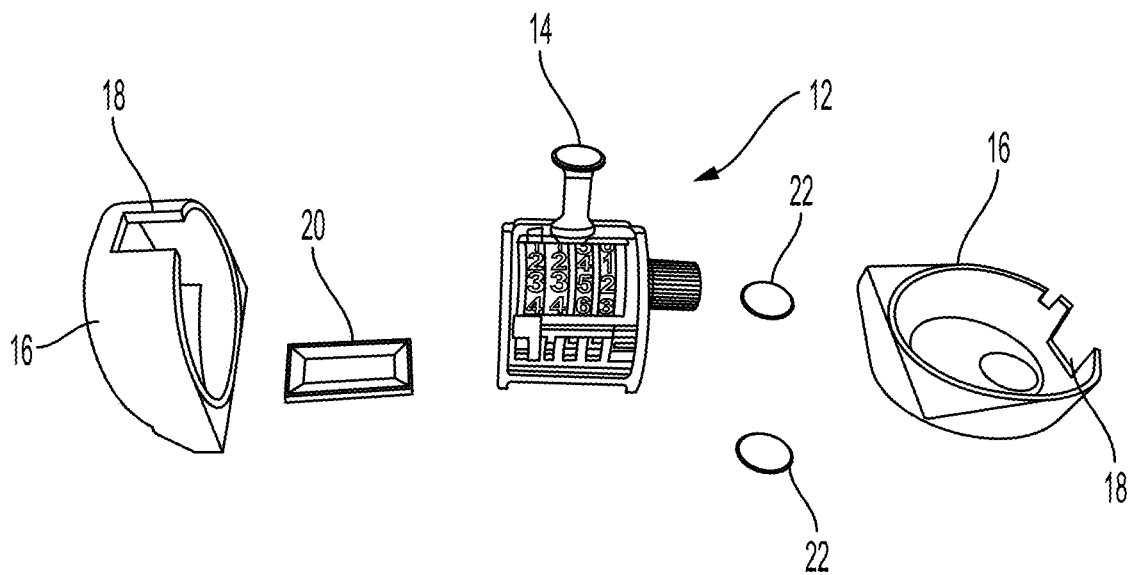

FIGS. 1A and 1B show an exemplary tracking assembly 10, respectively illustrated in assembled and disassembled representation. As shown, the assembly 10 includes a counter 12 that is mechanical in form with triggering arm 14 that advances the count of the counter 12 with every triggering or depression of the arm 14. To that end, and with reference to FIG. 1B, the counter 12 is encapsulated in a housing 16 with opening 18 being defined to visibly show the count quantity (via a display 20) as well as to allow extension there through of the triggering arm 14.

Figure 1C:
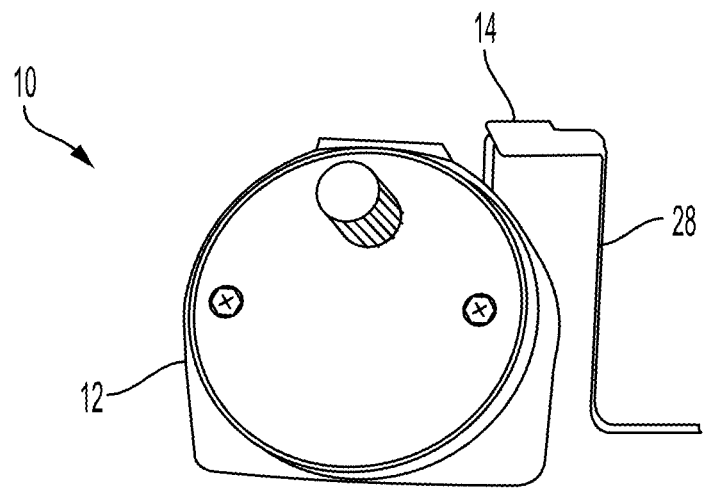
FIGS. 1C and 1D are side and top perspective views of the tracking assembly of FIG. 1A, respectively shown with exemplary linkage member and in position relative to a punch assembly in turret press, respectively, in accordance with certain embodiments of the invention.
Figure 1D:
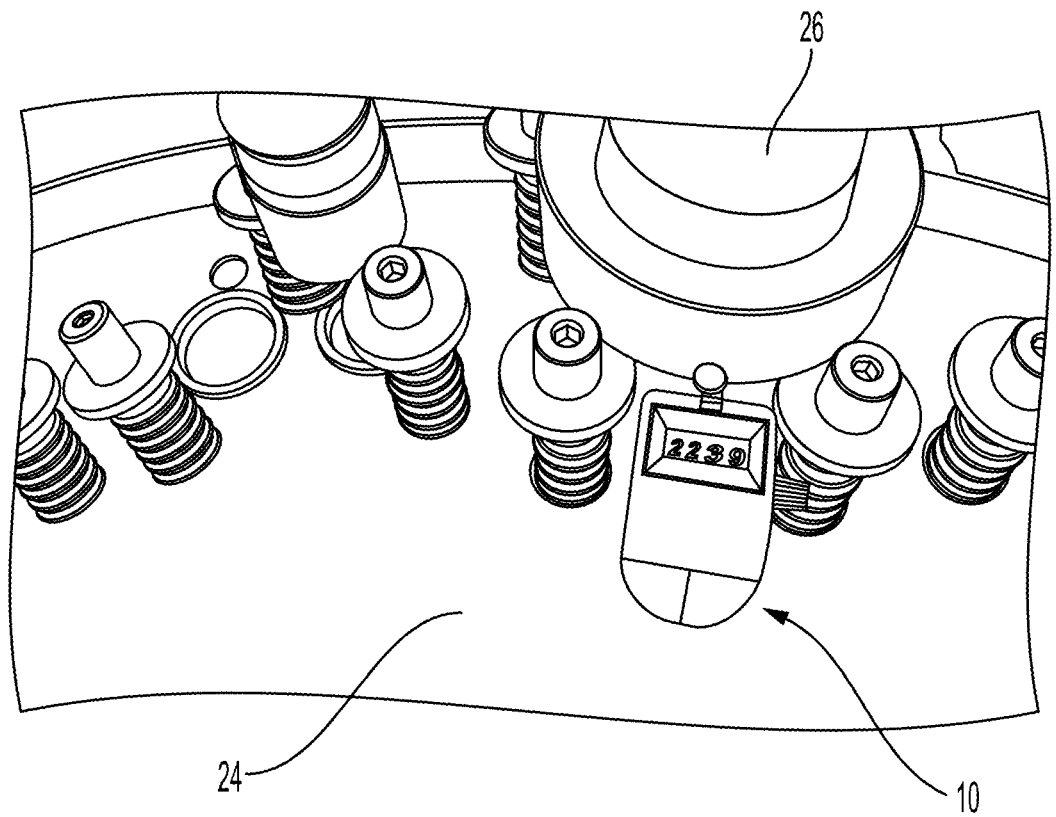

In certain embodiments, as shown, the housing 16 includes (e.g., being affixed thereto at a surface opposite the display 20) coupling mechanisms, e.g., one or more magnets 22, to temporarily retain positioning of the tracking assembly 10 during its use with the punch assembly or for temporary coupling to the punch assembly when removed from the machine. For example, in certain embodiments involving punch assemblies used with a turret press (see FIG. 1D), the tracking assembly 10 can be attached (via the magnet(s) 22) to a top surface of the turret table 24 and adjacent a corresponding punch assembly 26. In certain embodiments, contact between the triggering arm 14 and the punch assembly 26 is established via a linkage mechanism, e.g., such as an adjoining tab or lever 28 (see FIG. 1C). It should be appreciated that other linkage mechanisms can alternatively be used in place of such lever 28, as what is significant is the linkage established via such mechanism. Given this set-up, upon a "hit" or down stroke of punch and holder (via ram), there is a corresponding downward force on such linking mechanism, which deflects the triggering arm 14 to register a count via the counter 12. Upon removal of the punch assembly 26, the tracking assembly 10 can in turn be removed from (its magnetic attachment to) the turret table 24 and be similarly attached (via use of the magnet(s) 22) to a portion (e.g., top) of the punching assembly 26, to be kept together for later use of the punch assembly 26 within same machine or others.

Regarding the tracking assembly 10, there are benefits to its design, in terms of its simplicity. For example, the housing 16 provides a rugged enclosure for the counter 12, protecting it from environmental elements/conditions (oil, dirt, humidity, high vibration, etc.) generally encountered in industrial machines, such as a turret press. Also, there are no electronics involved, keeping the overall cost relatively low, but also minimizing the potential of breakdown or need for maintenance. However, use of such a tracking assembly 10 would involve the machine operator being responsible for accurately positioning the tracking assembly 10 relative to the punch assembly 26. Further, while the tracking assembly 10 being freely positionable/movable with corresponding use/removal of the punch assembly 26 can be seen as advantageous, this also avails the possibility that the assembly 10 is removed (i.e., separated from the punch assembly 26) when the punch assembly 26 is outside of the machine, whereby the tracking assembly 10 could be potentially misplaced in the process. Thus, there is need for alternate designs of tracking assemblies configured to be more readily used with, and/or more permanently tied to, the punch assembly.

Figure 2B:
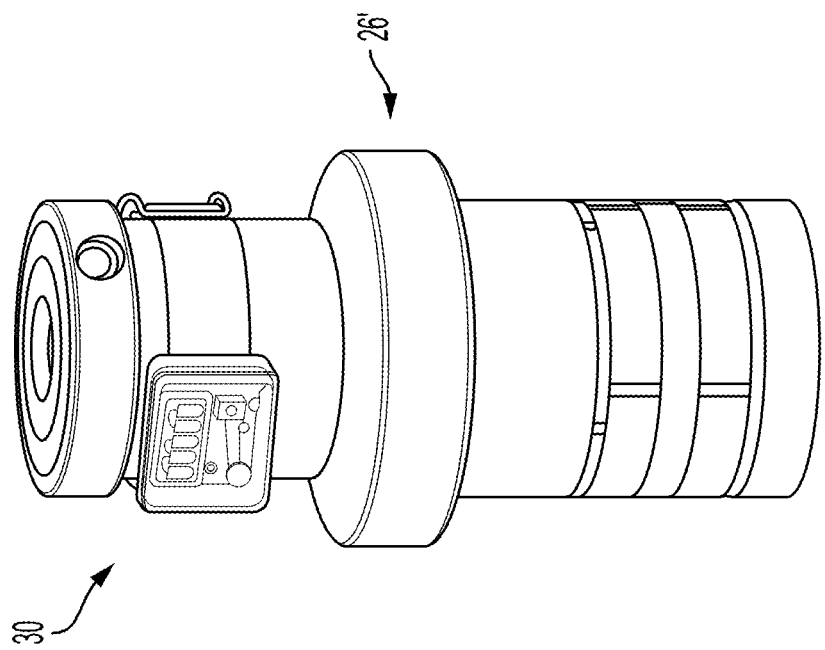
FIGS. 2A and 2B are perspective views of another exemplary tracking assembly for use with a punch assembly, respectively shown separate from and installed on a punch assembly, in accordance with certain embodiments of the invention.
Figure 2A:
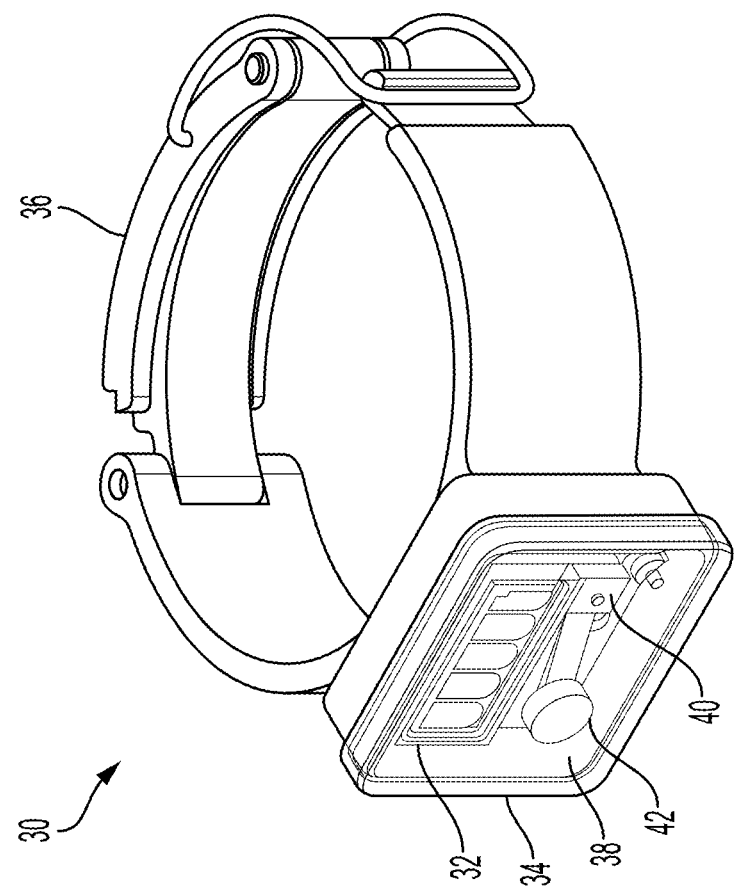

FIGS. 2A and 2B illustrate such an exemplary tracking assembly 30, respectively shown separate from and installed on a punch assembly 26'. As shown, and unlike the tracking assembly 10 of FIGS. 1A-1D, the assembly 30 has a counter display 32 that is electronic in nature (e.g., liquid crystal display) for showing at least the "hit/stroke count" associated with the punch assembly 26'. The display 32 is controlled via underlying electronics, with both being encased in a housing 34 which is rigidly coupled to upper portion of the punch assembly 26' via strapping mechanism 36. The strapping mechanism 36 is shown as a clamping strap; however, alternate designs can just as well be used. What is significant with such manner of securement is that the tracking assembly 30 is correspondingly locked in position for ready use in tracking the "hit/stroke count" of the punch assembly 26' when used in punch machines, even after removal (e.g., for maintenance) and later use in same machine or others. Further, as noted above, the strapping mechanism 36 provides more of a rigid attachment to the punch assembly 26', as compared to the tracking assembly 10 of FIGS. 1A-1D.

Continuing with the tracking assembly 30, the counter display 32 is made visible via an opening 38 defined in the assembly 30, and, via translucent depiction of the display 32, certain exemplary electronics are further illustrated, including a sensor 40 (for use as counter for each down stroke of the punch assembly 26') and a power source 42 (e.g., lithium button cell battery) for powering the electrical circuit. The sensor 40, in certain embodiments, can involve a potentiometer, the output of which varies based on a connecting segment's movement derived from the punch assembly's down stroke, and which variance advances the counter display 32. It should be appreciated that the sensor 40 can be any of a variety of alternate designs for advancing the "hit/stroke count" shown on the display 32. Further, the counter display 32 can take the form of any of a variety of differing electronic types; although in certain embodiments, the display 32 is configured with storage memory, such as EEPROM, such that a last "hit/stroke count" can be stored and readily retrieved, even in the event of temporary loss of power.

Regarding the tracking assembly 30, there are benefits to its design. For example, the housing 34 provides a rugged enclosure for the display 32 and its electronics, protecting them from environmental elements/conditions (oil, dirt, humidity, high vibration, etc.) generally encountered in industrial machines, such as a turret press. Also, while there are electronics involved in the design, they are fairly minimal, such that overall cost can still be kept relatively low. In addition (and as already noted), the manner by which the assembly 30 can be secured positions it for ready use in tracking the "hit/stroke count" of the punch assembly 26' when used in punch machines, even after being removed and reinstalled in same machine or others. To that end, even if the tracking assembly 30 were to be removed from the punch assembly 26', repositioning it on the assembly 26' for later use would be a fairly simple process using the strapping mechanism 36. However, the tracking assembly 30, via its housing 34, involves a somewhat large profile for the punch assembly 26' and perhaps one that, while functional, may be too cumbersome to use. Thus, there would be need for alternate designs of tracking assemblies configured to be more streamlined with the overall punch assembly design, and also more permanently tied to such design. Particularly, considerations were given to shaping of the tracking assembly relative to shape of the tooling used therefor.

Figure 3B:
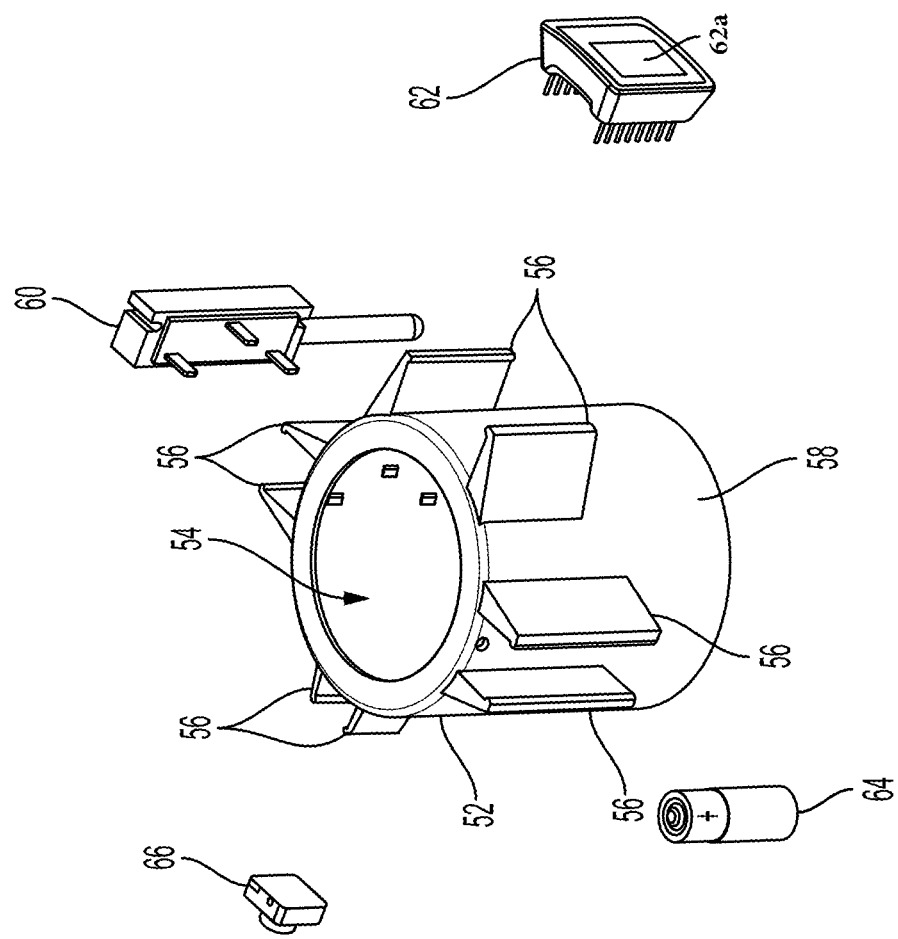
FIGS. 3A and 3B are perspective views of a further exemplary tracking assembly for use with a punch assembly, respectively shown in assembled and disassembled representations, in accordance with certain embodiments of the invention.
Figure 3A:
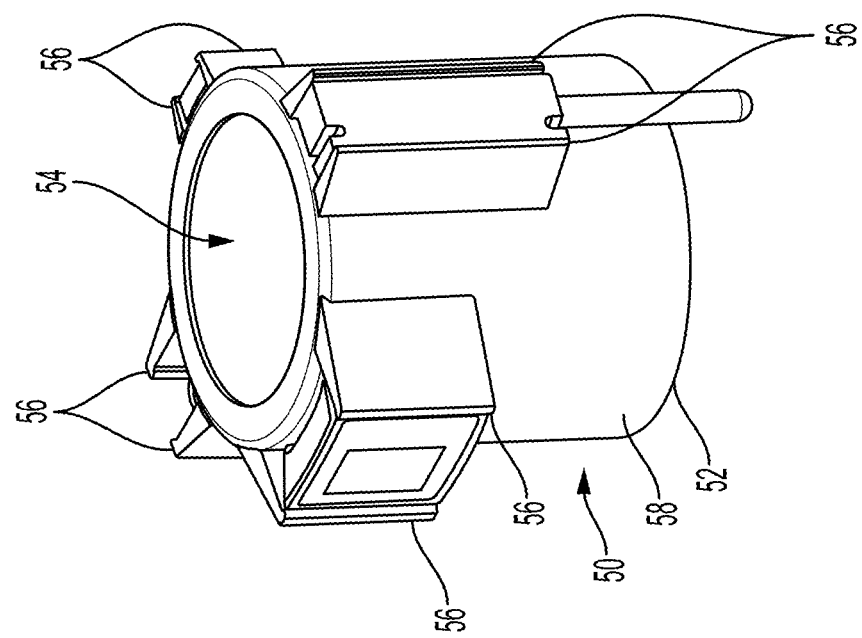

FIGS. 3A and 3B illustrate such a further exemplary tracking assembly 50, respectively shown in assembled and disassembled representations. As illustrated, the assembly 50 has a main body 52. In certain embodiments, as shown, the body 52 is shaped in the form of a collar and defined with axial bore 54 there through such that the body 52 can be slid around and subsequently be coupled to corresponding punch assembly. In certain embodiments, as shown, the body 52 can include one or more ridges 56 protruding from its exterior surface 58. The ridges 56, as shown in FIG. 3A, can be used to form an ergonomic grip around the exterior surface 58 for the machine operator. Furthermore, the ridges 56 partially house, and provide a form of protection, for various electrical/mechanical components mounted to the body 52 for the tracking functionality of the assembly 50.

For example, in certain embodiments, the components include at least a sensor 60 that is triggered via force applied (e.g., downward punching stroke) on a punch assembly. In certain embodiments, the sensor 60, with each triggering, delivers an output signal. Exemplary sensors include a switch, a potentiometer, an accelerometer, etc. In the case of accelerometers, which are commercially available as single or multiple axis types, the sensor 60 in measuring punching stroke would only need to perform measuring in one axis (vertical). The sensor 60, in certain embodiments, can be in electrical communication (e.g., electrically coupled) with a microcontroller 62 (e.g., Arduino-based open source design) for counting and storing quantity of punching strokes of the punch assembly during its use life. To that end, the microcontroller 62 would be configured with memory for such storage. In certain embodiments, the microcontroller 62 can be configured with various memory forms, such as Flash memory (32 KB), SRAM (2 KB), and EEPROM (1 KB), although these memory types and sizes can be varied as desired.

Given inclusion of the sensor 60 (such as accelerometer) and the microcontroller 62, a power source 64 (e.g., one or more DC batteries) is correspondingly warranted. Such power source 64, in certain embodiments, is electrically coupled to the sensor 60 and microcontroller 62 via wiring within the body 52. When the punch assembly 50 is not in use, e.g., removed from the punch press machine, there would be no need for the tracking assembly 50 to function, much less power the underlying electronics via the power source 64. Accordingly, in certain embodiments, the tracking assembly 50 includes a power switch 66 tied to the power source 64 for interruption of power as warranted.

Figure 3D:
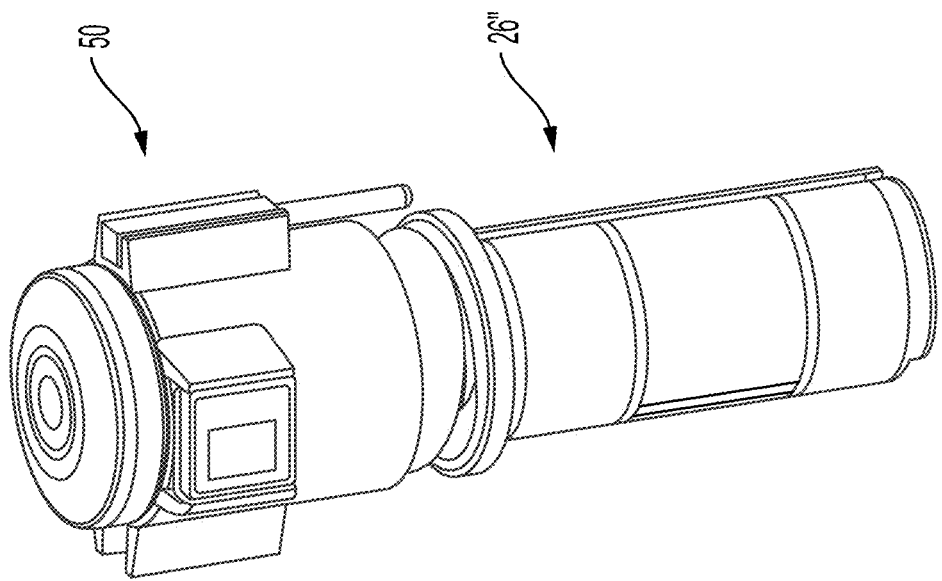
FIGS. 3C and 3D are perspective views of a punch assembly and the tracking assembly of FIG. 3A in exploded assembly and assembled representations, respectively, in accordance with certain embodiments of the invention.
Figure 3C:
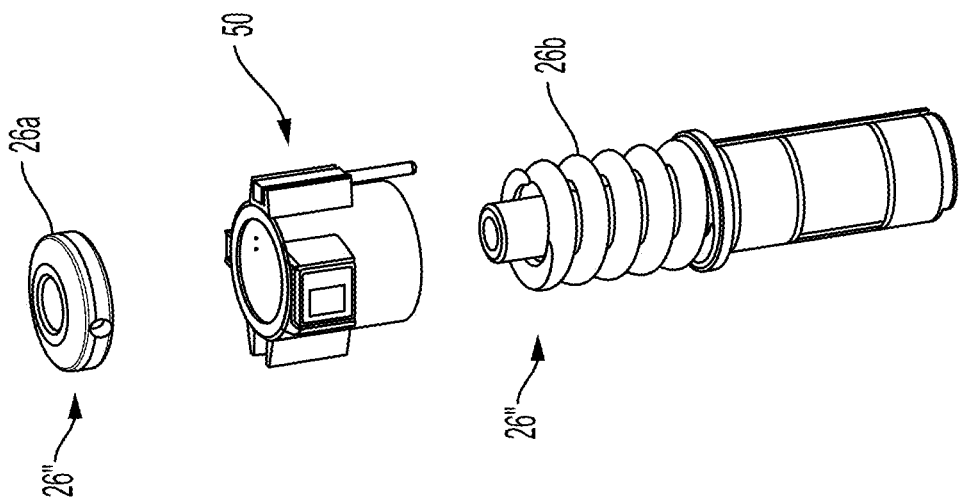

FIGS. 3C and 3D illustrate perspective views of a punch assembly 26" and the tracking assembly 50 in exploded assembly and assembled representations, respectively. As shown, the punch head 26a is disassembled (unscrewed) from the punch assembly 26'". The tracking assembly 50 is sized to fit over and around the upper portion of the spring 26b of the spring pack assembly for the punch assembly 26". In turn, the punch head 26a is reassembled onto the punch assembly 26". To that end, the tracking assembly 50 generally takes the form of a typical guide cover or sleeve for such punch assembly 26". As such, the tracking assembly 50, via its configuration and corresponding installation to the punch assembly 26", is more aligned with the standard punch assembly design.

In using a microcontroller 62 in place of a mechanical counter such as with the tracking assembly 10 of FIGS. 1A-1D or an electrical counter such as with the tracking assembly 30 of FIGS. 2A and 2B, the variety of information relating to the punch assembly 26" that can be additionally tracked and/or stored, and subsequently provided as warranted, is virtually limitless. Such enhanced functionality of the tracking assembly 50, however, directly corresponds to the underlying capabilities of the microcontroller 62. For example, in certain embodiments, as shown, the microcontroller 62 has a screen 62a to provide the machine operator with such varied information. This can include not only "hit/stroke count" data, but with underlying programming of the microcontroller 62, estimated conditions relating to both the punch assembly 26" and the tracking assembly 50 can also be provided. For instance, the microcontroller 62 can be programmed to process the "hit/stroke count" data to provide guidance, such as potential need to perform maintenance on punch tip of the punch assembly 26". Relating to the tracking assembly 50, based on duration of use thereof, guidance can be provided as to remaining capacity of the power source 64, and potential need for replacement of same.

Continuing with the above, in certain embodiments, the microcontroller 62 can be interfaced with broadcasting mechanisms to further enhance functionality of the tracking assembly 50. For example, the microcontroller 62 may be integrated with a Radio-Frequency Identification Device (RFID) to provide tracking information for the punch assembly 50. Using a RFID reader, the assembly 50 can be easily tracked and located, e.g., on a manufacturing floor or in a warehouse. To that end, the display 62a can provide corresponding message to the machine operator that it is the assembly being interrogated or queried. The RFID tag provided on such tracking assembly 50 can store various other information concerning the punch assembly's base parameters, such as punch tip size, shape, part number, clearance guidelines, etc., which can be further assessed upon location of the assembly 50.

Furthermore, in certain embodiments, the microcontroller 62 can be integrated with BlueTooth (BT) or Bluetooth Low Energy (BLE) interface for communicating with one or more of the machine operator (e.g., via Smart phone or other Bluetooth-configured device), a local network, and/or a cloud service relating to parameters and/or statuses of the punch assembly 26" and/or the tracking assembly 50. In certain embodiments, the communication from the tracking assembly 50 via the BT or BLE interface to the machine operator can be in the form of text, email, instant message, etc. It should be appreciated that with such outlet for information from the microcontroller 62, the need for a display 62a thereon is reduced, but for a duplicative or fall back means of communication. To that end, the information can be transmitted to any mobile device relative to a corresponding application (programmed/downloaded on the device; hereinafter, "app"), e.g., via BLE interface, and once on the app, the information can be further uploaded to cloud storage, accessible via any web browser. As should be further appreciated, the BT or BLE interface can be used just as well for inquiries from the machine operator, e.g., to locate punch assemblies within a facility that are equipped with tracking assembly 50 and corresponding characteristics of the corresponding punch assemblies.

For example, in certain embodiments, the user can have the tracking assembly 50 be powered (or "woken up") via the app or by the initial stroke of the corresponding machine that the tool (and corresponding tracking assembly) is used therewith. If user initiated, the app is configured to find the tracking assembly 50 automatically and subsequently connect to it. The user then places the tool in the machine (or the tool may already be in the machine) and begins operation. While the machine is operating, the app is open in the foreground and registering data (e.g., hit count data) once per second by the BLE interface connection (machines punches/strokes are typically faster than once per second, whereby accumulated totals are registered via the tracking assembly 50 and transmitted). The display on the device (and in conjunction with the app) reflects the data as warranted (e.g., hit count since reset and/or total hit count). To that end, these hit count quantities can be reset via the app. In certain embodiments, the tracking assembly 50 can be configured to simultaneously send the data to cloud storage, for the data to then be available (e.g., via custom website) for others to remotely view or recall, as is warranted.

Regarding the tracking assembly 50, there are benefits to its design. Not only is the configuration better aligned for integration with the standard punch assembly design, but with use of the microcontroller 62 used therewith, the functionality of the tracking assembly 50 and the plurality of information obtainable therefrom is enhanced. However, there perhaps would be need for alternate design of a tracking assembly even more streamlined to the profile of the punch assembly, while also providing better protection of its electronics from the environmental elements/conditions encountered in industrial machines. To that end, in certain embodiments as further described, a shielded configuration can be provided for the tracking assembly.

Figure 4:
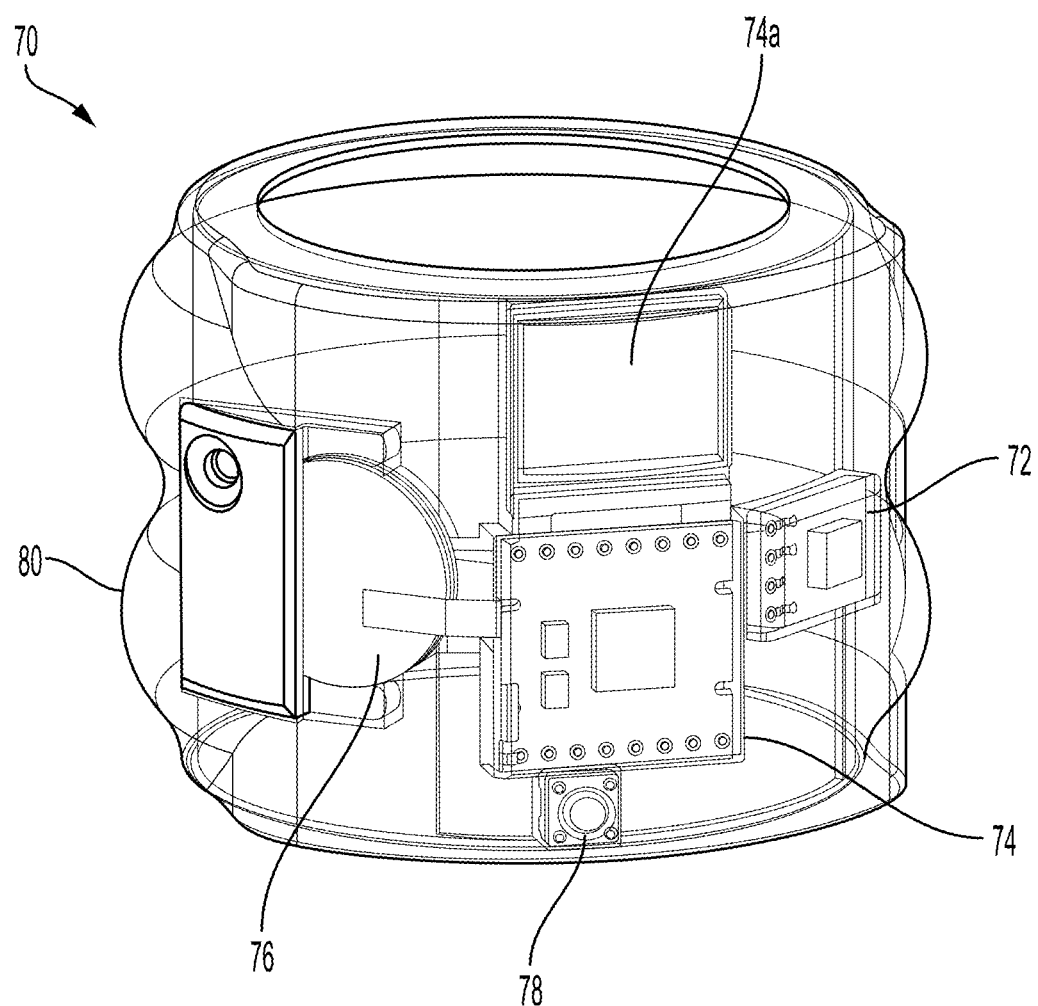
FIG. 4 is a perspective view of an exemplary tracking assembly with sheathed configuration for use with a punch assembly and shown with sheath in translucent representation, in accordance with certain embodiments of the invention.

FIG. 4 illustrates such an exemplary tracking assembly 70 having sheathed configuration, with its sheath 80 representatively shown as translucent. The assembly 70 is configured for like-functionality and enhanced capability, similar to that already described above for the tracking assembly 50 of FIGS. 3A-3D. To that end, the assembly 70 includes like-electronic components, including sensor 72 (such as accelerometer), microcontroller 74 (and display 74a, which can be optional, as already described above), power source 76 (such as lithium button cell battery), and power switch 78, yet is carried within continuous sheath 80 configured to be provide a tighter, more streamlined profile and more protective enclosure in comparison to the tracking assembly 50 of FIGS. 3A-3D. To that end, it should be appreciated that the punch assemblies used with the tracking assemblies embodied herein often vary by their corresponding station sizes. As such, the sizes of the tracking assemblies may need to be correspondingly varied. However, relative to the streamlined profile noted above for the tracking assembly 70, the extent by which its profile ranges beyond the outer diameter of the punch assembly surface (which the assembly surrounds) is kept to a minimum. For example, in certain embodiments, the outer diameter is increased by not more than 0.4" (about 10 mm), and perhaps in more preferable embodiments, by not more than 0.314" (about 8 mm), and perhaps in even more preferable embodiments, by not more than 0.275" (about 7 mm).

Figure 5B:
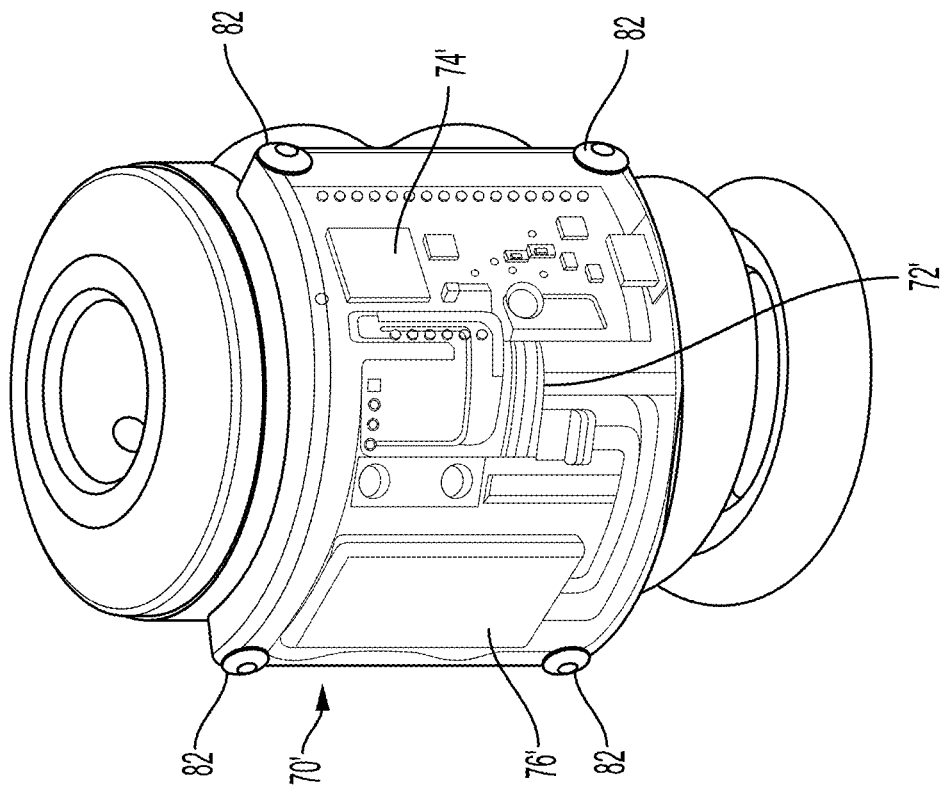
FIGS. 5A and 5B are perspective views of another exemplary tracking assembly with sheathed configuration for use with a spring pack of a punch assembly, respectively shown with sheath in solid and translucent representations, in accordance with certain embodiments of the invention.
Figure 5A:
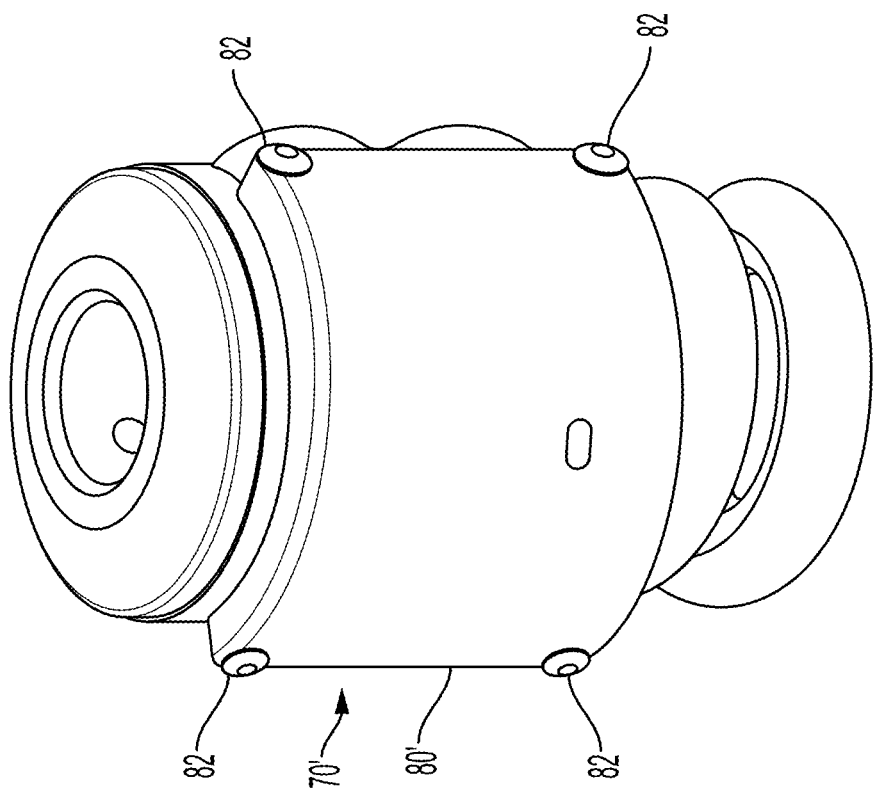

FIGS. 5A and 6A illustrate further exemplary tracking assemblies 70' and 70", each having a sheathed configuration with similarities to the assembly 70 of FIG. 4, with FIGS. 5B and 6B showing the assemblies 70', 70" with their sheaths 80', 80" each representatively shown as translucent. To that end, while the tracking assembly 70" is configured for extending continuously around a portion of the tool assembly, the tracking assembly 70' is configured to extend around only a portion of the tool assembly and as shown, in certain embodiments, can be operably coupled to the tool assembly via fasteners 82. Thus, attachment means for the various tracking assemblies can vary, based on the tools they are used with and their size configurations. For example, in certain embodiments, as should be appreciated from the assemblies described to this point (and later herein), the means of attachment can involve adhesives, clips, straps, or fasteners (for rigid attachment). Moreover, it will be appreciated that the assemblies, in some cases such as exemplified in FIGS. 8-10, could be built directly into the tools or tool assemblies.

As should be appreciated, the assemblies 70' and 70" have functionality and capability similar to that already described above for the tracking assembly 70 of FIG. 4. To that end, the assemblies 70', 70" include like-electronical components, each respectively including sensor 72', 72", microcontroller 74', 74", power source 76', 76", and power switch, while the sheaths 80', 80" are again configured to provide varied streamlined profiles for their corresponding punch assemblies. Furthermore, with such sheathing, activation of the tracking assemblies 70', 70" can be performed without a physical power switch. Instead, such activation/shut-down, in certain embodiments, can be performed remotely by the user with mobile device (via corresponding app), as already described.

Figure 7B:
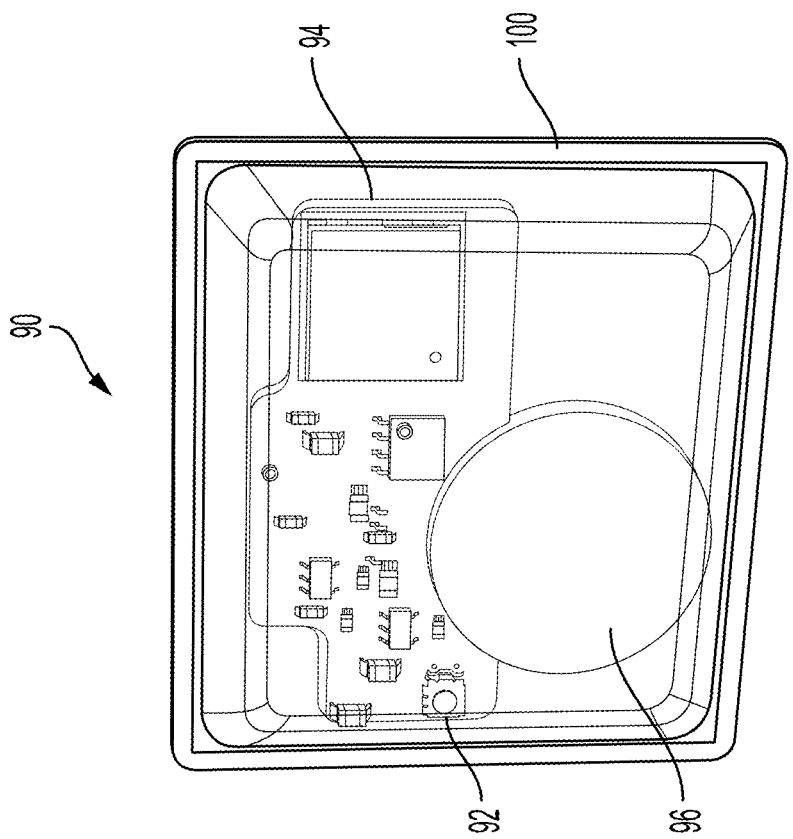
FIGS. 7A and 7B are perspective views of an even further exemplary tracking assembly with sheathed configuration for use with a punch assembly, respectively shown with sheath in solid and translucent representations, in accordance with certain embodiments of the invention.
Figure 7A:
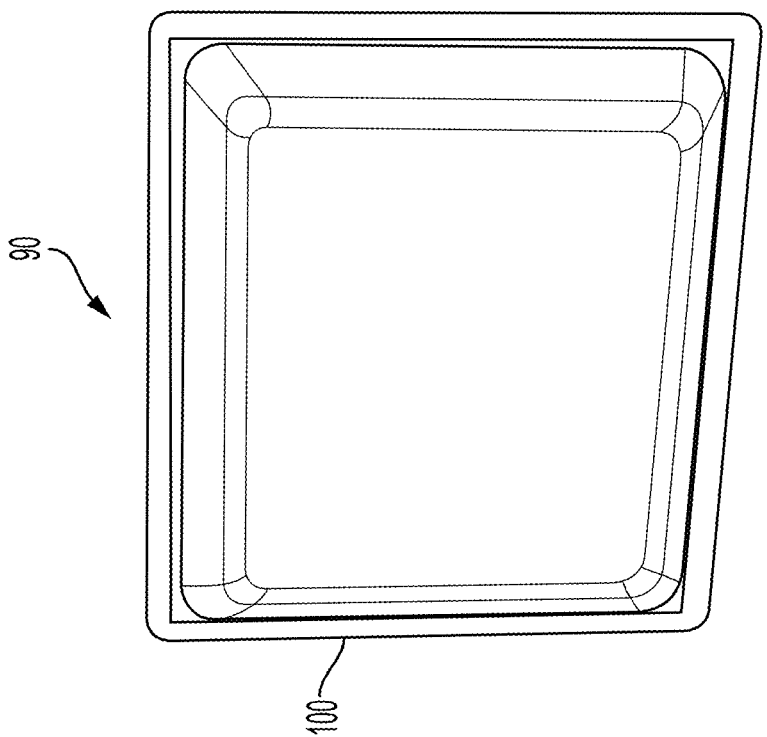
Figure 7C:
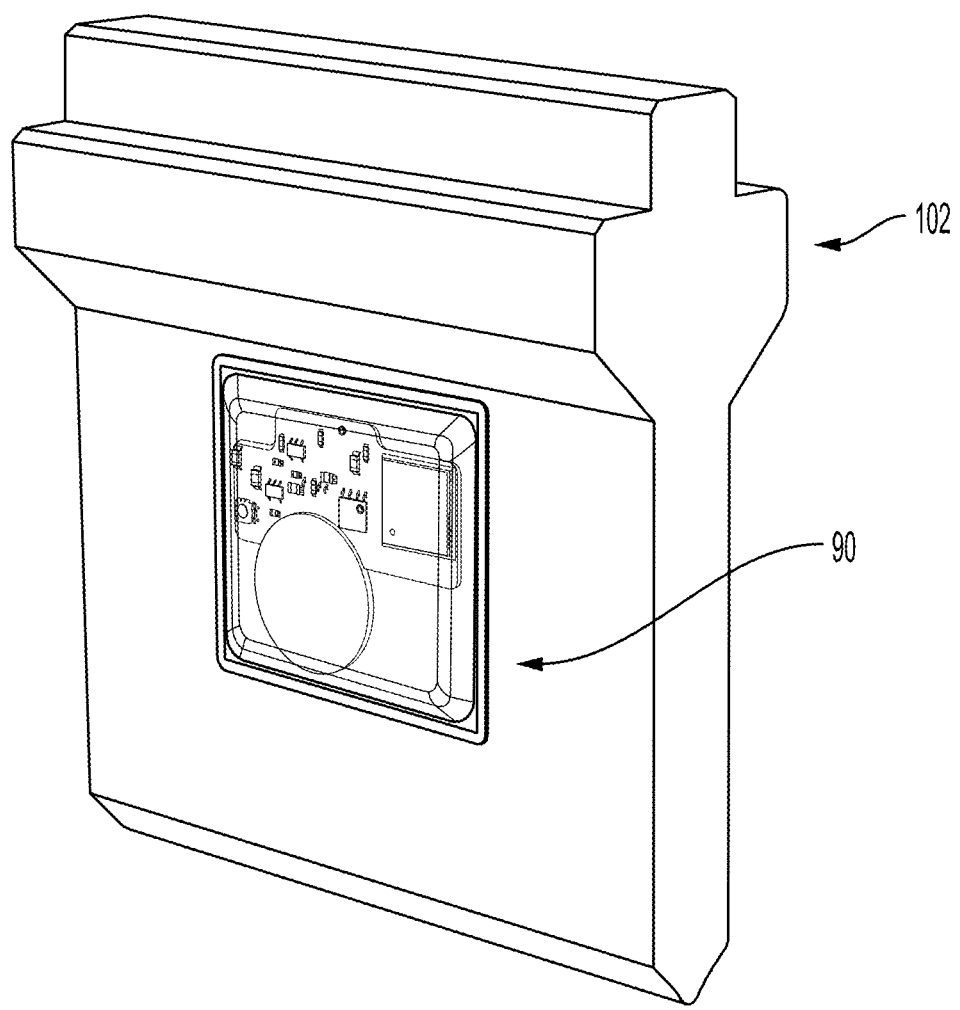
FIG. 7C is a perspective view of the tracking assembly shown in FIG. 7B, exemplarily mounted on press brake tool in accordance with certain embodiments of the invention.

FIG. 7A illustrates a further exemplary tracking assembly 90 having sheathed configuration, with FIGS. 7B and 7C showing the assembly 90 with its sheath 100 representatively shown as translucent, and FIG. 7C showing the assembly 90 mounted to exemplary tooling 102 (press brake tool). As should be appreciated, the assembly 90 has functionality and capability similar to that already described above for the tracking assemblies 70 and 70" of FIGS. 4 and 6A, respectively. To that end, the assembly 90 includes like-electronical components, e.g., sensor 92, microcontroller 94, and power source 96, while the sheath 100 is configured to provide a streamlined profile for the corresponding tooling. To that end, as opposed to wrap-around configurations, the assembly 90 has a planar configuration to be used with tooling having largely planar surfaces. Based on such configuration, there is less occasion for size variance of the tracking assembly 90, as compared to the assemblies 70, 70', and 70" of FIGS. 4-6

Concerning the embodied tracking assemblies 50, 70, 70', 70", and 90 exemplified herein, the features thereof can take many forms, but are generally provided to enable the size of the assemblies to be minimized. In certain embodiments, the dimensions of the tracking assembly, in certain preferable embodiments, are no greater than 1" in length, no greater than 1" in width, and no greater than 0.25" in thickness. To that end, the power source for the assembly, if a battery, can take the form of a coin cell battery, e.g., CR2025, having a life of at least 6 months. In certain embodiments, corresponding powering circuit of the tracking assembly can be configured to power down the power source automatically when not in use, and triggering power source when motion is sensed, e.g., via punch stroke, as already described herein. Relative to the sensor of the tracking assemblies, if an accelerator, it would be configured for measuring the punching stroke along at least a single axis.

Figure 8A:
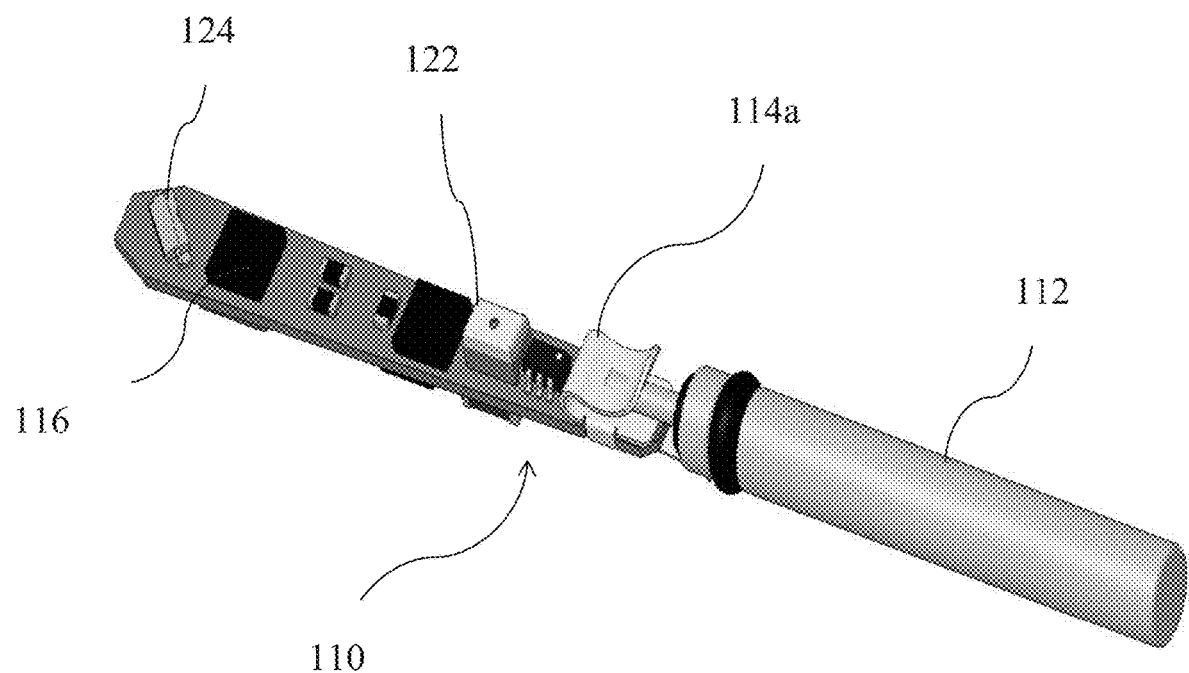
FIGS. 8A and 8B are top and bottom perspective views of another exemplary tracking assembly having tray configuration for use with a punch or punch assembly in accordance with certain embodiments of the invention.
Figure 8B:
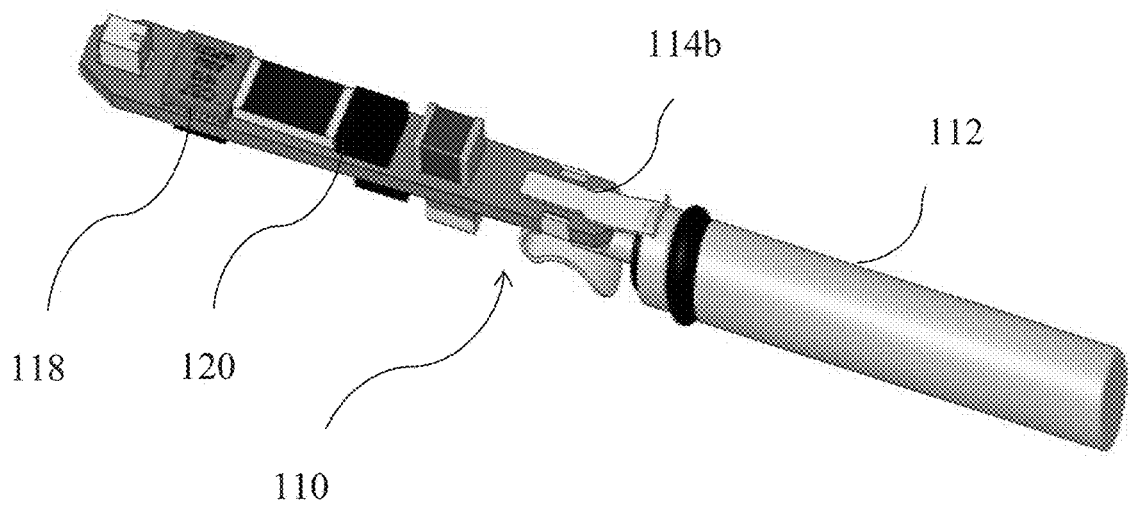

Many of the tracking assemblies embodied to this point have been focused on designs with streamlined profiles. Starting with FIGS. 8A and 8B (and continuing for FIGS. 9A/9B and 10A/10B/10C), a further tracking assembly 110 is illustrated/described, which has a configured enabling it to be recessed or embedded within a tooling or tool assembly. To that end, the assembly 110 has a tray-like configuration, with FIGS. 8A and 8B showing top and bottom views of the assembly. Similar to the tracking assemblies 50, 70, 70', 70", and 90 already described, the further tracking assembly 110 is configured for same functionality and enhanced capability (e.g., data/information tracking, storage, dissemination, transmission, etc.). However, with such tray configuration (e.g., with cylindrical profile), the assembly 110 can be used for embedded (or recessed) mounting, within a tool or tool assembly, so as to not add to the profile thereof. The assembly 110 includes electronic components that have similar functioning to that already described, such as sensor 116 (such as potentiometer or accelerometer), microcontroller 118, and power source 112 (cylindrical battery) and corresponding connectors 114a/114b to trigger the circuit as warranted. For example, as already described, while movement of the assembly 112 and sensing of the same via the sensor 116 may trigger data collection via the microcontroller 118, the assembly 110 has other components, such as BlueTooth (BT) or Bluetooth Low Energy (BLE) interface 120 for communicating with one or more of the machine operator (e.g., via Smart phone or other Bluetooth-configured device), a local network, and/or a cloud service relating to parameters and/or statuses of the tool and/or the tracking assembly 110. Further, the assembly 110 can demonstrate or signal status via auditory (e.g., speaker 122) and/or visual means (e.g., LED 124). Designs and configurations for such assemblies 110 are commercially available from Breadcrumb (Tracking Technology) LLC, with teachings concerning the same hereby incorporated in relevant part from U.S. Patent Appl. Publication No. US 2017/0261295.

Figure 9A:
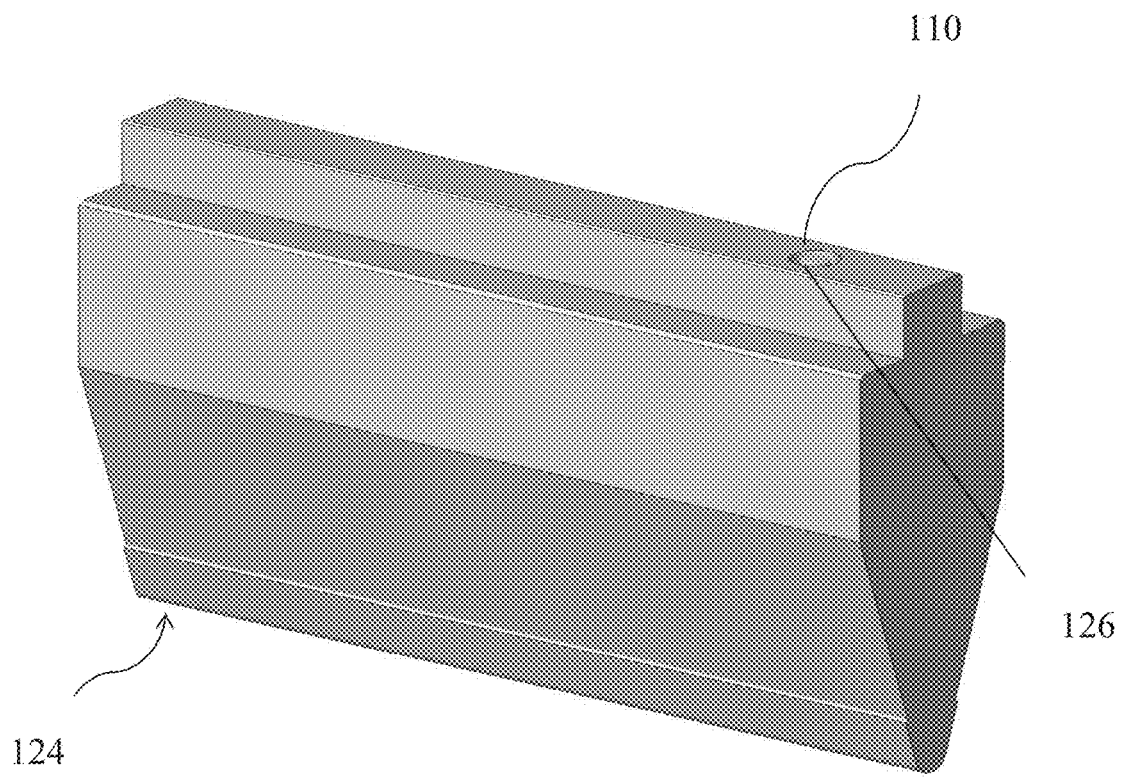
FIGS. 9A and 9B are side perspective views of the tracking assembly of FIGS. 8A and 8B used with a punch in accordance with certain embodiments of the invention.
Figure 9B:
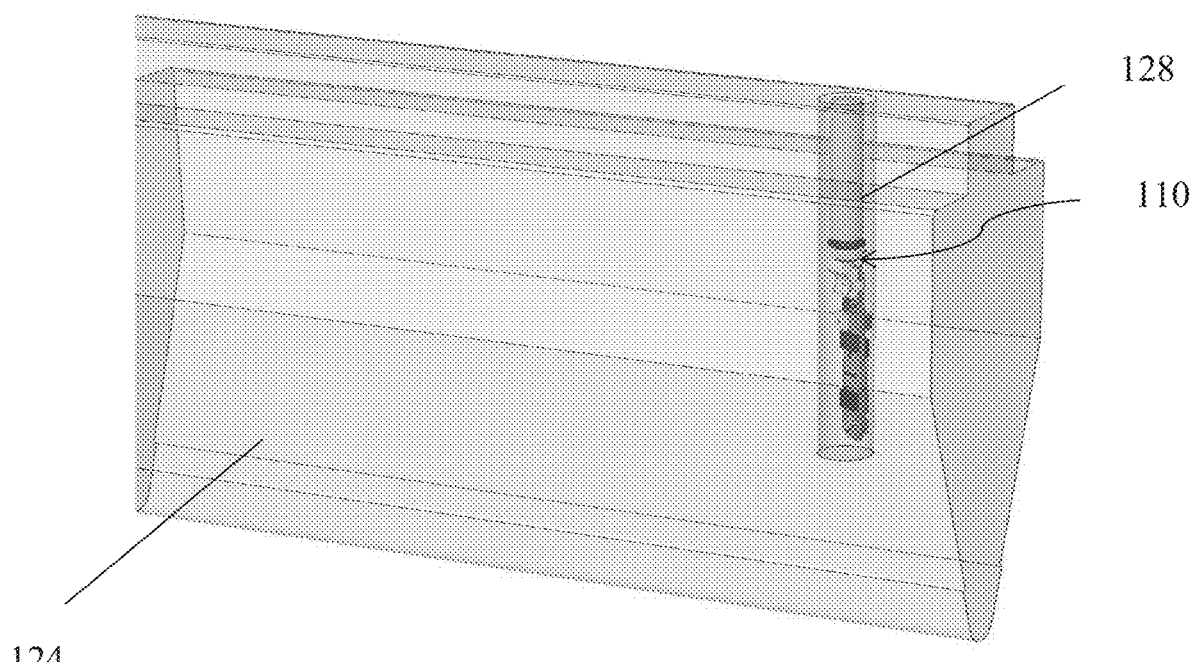

FIGS. 9A and 9B show an exemplary mounting of the tracking assembly 110 within a tool 124, with FIG. 9B providing a translucent representation of the tool 124. As should be appreciated, the tool 124 is exemplarily shown as a punch for a press brake; however, the invention should not be limited to such. For example, so long as the tracking assembly 110 has a length that can be accommodated by the tool, the assembly 110 is applicable for such recessed/embedded mounting therewith. To that end, while the assembly 110 is shown as mounted in the tool 124 so as to be vertically oriented (i.e., parallel to pressing axis along which the tool 124 is directed against a workpiece), it should be appreciated that the assembly could alternately be mounted in a crosswise orientation (i.e., perpendicular to the pressing axis), so long as the sensor 116 is configured/oriented to sense movement in direction alternate to longitudinal extent of the assembly 110.

As shown, the tracking assembly 110 is provided in a bore 126 that, in certain embodiments, is defined directly in line with the mounting stem of the tool 124. Such direct alignment is not warranted (as will be shown via the further mounting configuration of FIGS. 10A-10C); however, orienting the assembly 110 in such manner often provides the greatest length of the tool (in that pressing direction) for the assembly 110 to extend. In certain embodiments, the assembly 110 is potted into the tool 124. To that end, the open space in the bore 126 not accommodated by the assembly 110 is filled, e.g., with a solid or gelatinous compound 128 (such as thermo-setting plastics or silicone rubber gels), for resistance to shock and vibration and for exclusion of moisture and corrosive agents. As shown, the battery 112 is closest to the opening of the bore 126, so as to remain accessible for replacement as warranted.

FIGS. 10A-10C show exemplary mounting of the tracking assembly 110 within a tool assembly 130, with FIG. 10A showing a cross-sectional view of such tool assembly 130 across its longitudinal extent. Accordingly, a punch head 132, a punch guide 134, and punch tip 136 are all visually shown in cross-section, and the tracking assembly 110, in certain embodiments as illustrated, is embedded/recessed within the punch head 132. However, the invention should not be limited to such, as the tracking assembly 110 can be alternately provided in any portion of the tool assembly 130, provided the portion has some corresponding movement with the punch tip when used for machining. As perhaps best shown with reference to FIGS. 10B and 10C, and similar to that described relative to the mounting of FIGS. 9A-9B, the tracking assembly 110 is contained (e.g. potted) within a vertically-oriented bore 132a of the tool assembly 130 (i.e., parallel to pressing axis along which the punch head 132 is adapted to be moved, and correspondingly the punch tip 136 when directed against a workpiece). Again, it should be appreciated that the assembly 110 could be mounted in a crosswise orientation (i.e., perpendicular to the pressing axis), so long as its sensor 116 is configured/oriented to sense movement in direction alternate to longitudinal extent of the assembly 110.

Relative to connectivity of the tracking assemblies, it should be appreciated that there are various configurations that could be used, such as cellular, Wi-Fi, and/or Bluetooth (as already noted herein). As described herein, in certain embodiments, an app-based remote connection is used with the tracking assemblies. To that end, information is transmitted from the assemblies to exemplary mobile device, and app of the device can be used for display any of a variety of updates, statuses, and/or alerts relative to the tracked information and/or pertaining to the corresponding tooling (e.g., concerning tool identification info, hit counts, sharpening, reordering, etc.) or the tracking assembly (e.g., concerning the battery status, future warranted programming, etc.). Further, as already described in certain embodiments, the tracking assemblies can be BLE interface linked to a mobile device (near the machine) running an app to record the data from the tool. This app in turn can be used to transfer the data to cloud storage via Wi-Fi, with such storage accessible via any web browser.

Given the description provided to this point, it should be appreciated that the tracking assemblies can be quite diverse in their collection, dissemination, and transmission (for display and/or storage) capabilities, and thus have wide-ranging use, including applications described here and others. To that end, the possibilities for their use are virtually limitless relative to information pertaining to the tooling with which the assemblies are used. Relative to the tracking assemblies having communication capabilities with mobile devices, and app thereof, the app could further be configured with scanning functionality. For example, by simply scanning a bar code on outer surface of the tracking assembly (or corresponding paperwork provided therefor), an upload of all data relating to the corresponding tooling could be transmitted into the app (via the mobile device and corresponding wireless interface, e.g., BLE interface). Such data, in certain embodiments, can be used to identify the corresponding tool and aid in reordering. Another example relative to use of an app with tracking assembly can involve automatic order entry initialization for replacement tooling as the tool nears the end of its service life. To that end, in certain embodiments, the user can be prompted (via the app) to finalize the transaction, e.g., select "Buy Now" button, and all corresponding tooling data and purchase information is sent to user (or other agent) for the order.

Relative to applications for locating particular tooling with tracking assembly, the user (e.g., using mobile device and corresponding app) would be able to find the tool within a facility, or within a multi-building facility. For example, with the tracking assembly being "woken up" (as already described herein), the assembly can be further equipped with a light (e.g., LED) and/or speaker so that they are also triggered to help identify tool when user is close to its location. In using mobile device and corresponding app, the tracking assemblies can also be used with tooling for other machines, such as sharpening machines to track corresponding punches and the extents thereof utilized over time for sharpening processes. Such tracking data, and similar to the type of date tracked relative to punching, bending, stamping, and compression operations, can be analyzed (disseminated) for gauging tool efficiency, while also tracking timing and need for replacement tooling to be ordered (as already described).

Figure 11:
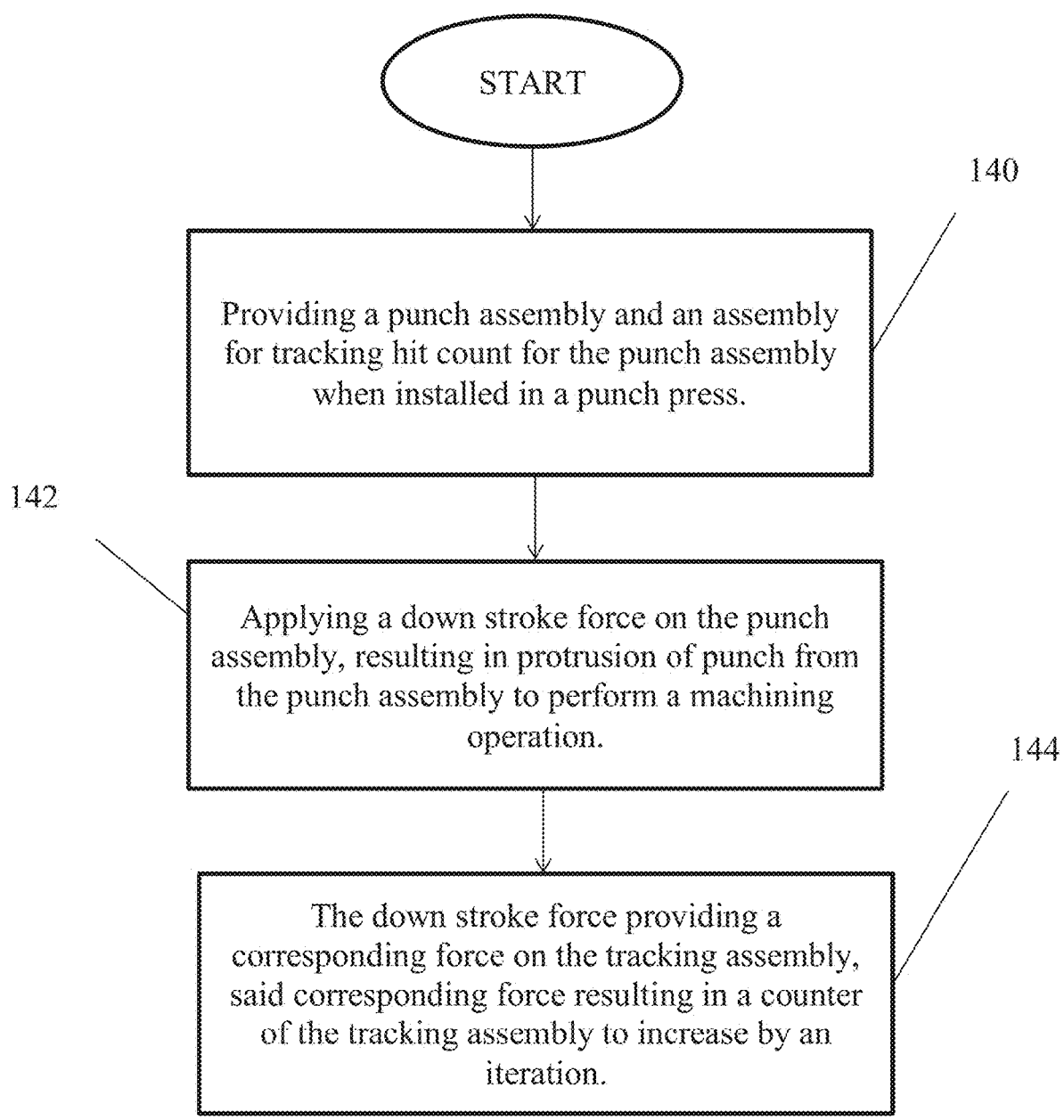
FIG. 11 is a flowchart of exemplary method of initial tracking of a punch assembly's "hit/stroke count" in utilizing any of the tracking assemblies of FIGS. 1-10 in accordance with certain embodiments of the invention.

FIG. 11 shows a flowchart of method of initially tracking "use history" of a punch assembly utilizing any of the tracking assemblies embodied herein. Step 140 of the flowchart involves providing a punch assembly and an assembly for tracking a hit/stroke count for the punch assembly when installed in a punch press. The punch assembly comprises a punch holder and a punch attached to the holder, while the tracking assembly is operably connected to the punch assembly and comprises a counter. Another step 142 involves applying a down stroke force on the punch holder, resulting in protrusion of the punch from the punch assembly to perform a machining operation. In certain embodiments, the down stroke force noted in step 142 stems from a downward ram stroke upon the punch head of the punch assembly when installed in the punch press. Further step 144 involves the down stroke force providing a corresponding force on the tracking assembly, wherein said corresponding force on the tracking assembly results in the counter to increase by an iteration.

With further reference to the flowchart of FIG. 11, particularly with use of the tracking assemblies 10, 30, 50, 70, 70', 70", 90, and 110 embodied herein, it should be appreciated that for repeated machining operations involving the punch assembly, there would be a corresponding quantity of looping from step 144 to step 142. Otherwise, if there is some duration between machining operations involving the punch assembly, e.g., whereby the machining process is finished or other punch assemblies are subsequently used, there would be no looping from step 144 to step 142. Instead, upon a next use (machining operation) involving the punch assembly, step 142 would be the initial step. Furthermore, upon removal of the punch assembly with the tracking assembly from the punch press (e.g., for maintenance of the punch of the punch assembly), and then later installation of the punch assembly and tracking assembly in same or other punch press, step 142 would again be the initial step for a first machining operation involving the punch assembly in the press machine.

Thus, embodiments of a TOOL TRACKING ASSEMBLY are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A method of initially tracking use history of a tool assembly comprising the steps of:
   providing a tool assembly and an assembly for tracking a hit/stroke count for the tool assembly when installed in an industrial machine, the tool assembly comprising a tool, the tracking assembly operably coupled to the tool assembly and comprising a counter;
   applying a force relative to the tool assembly, resulting in the tool being used for a machining operation, the force providing a corresponding force on the tracking assembly;
   wherein said corresponding force on the tracking assembly results in the counter to increase by single iteration;
   wherein the tracking assembly comprises a body within which the counter is provide;
   wherein the counter is electrical in form, and wherein the tracking assembly comprises a sensor, the corresponding force on the tracking assembly resulting in a triggering of an output from the sensor;
   wherein the counter comprises a microcontroller, the output from the sensor being received by the microcontroller and resulting in the iteration increase, and storage in memory of the microcontroller of total hit/stroke count of the tool assembly; and
   wherein the microcontroller is interfaced with a Radio-Frequency Identification Device to provide tracking information for the tool assembly.

2. The method of claim 1 wherein the counter is mechanical in form, and wherein the tracking assembly is positioned adjacent to a lower portion of the tool assembly.

3. The method of claim 1 wherein counter comprises a liquid crystal display, the output from the sensor being received by the liquid crystal display and resulting in the iteration increase, and storage in memory of the liquid crystal display of total hit/stroke count of the tool assembly.

4. The method of claim 1 wherein the microcontroller is interfaced with BlueTooth or Bluetooth Low Energy interface for communicating with one or more of a machine operator, a local network, and a cloud service relating to parameters/statuses of the tool assembly and the tracking assembly.

5. The method of claim 1 wherein the tool is a punch, the tool assembly correspondingly being a punch assembly and the industrial machine being a punch press.

6. The method of claim 5 wherein the force applied relative to the tool assembly is a down stroke force from the punch press.

7. The method of claim 1 wherein the sensor comprises a potentiometer, the corresponding force on the tracking assembly resulting in a variance in the output from the potentiometer, the variance in output received by the counter.

8. The method of claim 7 wherein the counter and the potentiometer are provided in an enclosure, the enclosure secured to an upper portion of the tool assembly via a clamping strap.

9. The method of claim 1 wherein the sensor is an accelerometer, the corresponding force on the tracking device resulting in a variance in the output from the accelerometer, the variance in output received by the counter.

10. The method of claim 9 wherein the counter and the accelerometer are provided within a sleeve covering an upper portion of the tool assembly.

11. A tracking assembly for use with a tool assembly comprising:
   a body formed in a shape of a collar, the collar sized so as to wrap about a portion of the tool assembly; and
   electronic devices operably coupled to the collar, the electronic devices comprising a sensor and a counter that are in electrical communication, the sensor triggered from a force applied to the body, with an output from the sensor serving as a trigger for the counter to increase by single iteration;
   wherein the sensor is a potentiometer, the force resulting in a corresponding force on the tracking assembly resulting in a variance in the output from the potentiometer, the variance in output received by the counter.

12. The tracking assembly of claim 11 wherein the collar comprises a sheathed configuration within which the sensor and the counter are provided, the collar forming a sleeve configured for covering the portion of the tool assembly.

13. The tracking assembly of claim 12 wherein the counter comprises a microcontroller, the output from the sensor being received by the microcontroller and resulting in the iteration increase, and in event of the tracking assembly being used with a punch assembly for a punch press, the iteration increase corresponding to hit/stroke count of the punch assembly.

14. A tracking assembly and a tool assembly forming a combination, the combination comprising:
- a sleeve body that is wrapped about a portion of the tool assembly, the tool assembly comprising a tool, the tool being either a punch or a die; and
- electronic devices operably coupled to the sleeve body, the electronic devices comprising a sensor and a counter that are in electrical communication, the sensor triggered from a force applied to the tool for performance of a machining operation therewith, with corresponding output from the sensor serving as a trigger for the counter to increase by an iteration;
- wherein the sensor is an accelerometer, the corresponding force on the tracking device resulting in a variance in the output from the accelerometer, the variance in output received by the counter; and
- wherein the counter and the accelerometer are provided within the sleeve body covering an upper portion of the tool assembly.

15. The combination of claim 14 wherein the counter comprises a microcontroller, the output from the sensor being received by the microcontroller and resulting in the iteration increase, and storage in memory of the microcontroller corresponding to a hit/stroke count of the tool assembly.

16. The combination of claim 14 wherein the electronic devices are encapsulated in a sleeve, the sleeve outer diameter extending beyond an outer diameter of the tool assembly by not more than 0.4".

17. A tracking assembly for use in combination with a tool or a tool assembly, the combination comprising:
- a body embedded within the tool or the tool assembly; and
- electronic devices operably coupled to the body, the electronic devices comprising a sensor and a counter that are in electrical communication, the sensor triggered from a force applied to the tool or tool assembly for performance of a machining operation, with corresponding output from the sensor serving as a trigger for the counter to increase by single iteration;
- wherein the counter comprises a microcontroller, the output from the sensor being received by the microcontroller and resulting in the iteration increase, and storage in memory of the microcontroller of total hit/stroke count of the tool or tool assembly; and
- wherein the microcontroller is interfaced with BlueTooth or Bluetooth Low Energy interface for communicating with one or more of a machine operator, a local network, and a cloud service relating to parameters/statuses of the tool or tool assembly and the tracking assembly.

18. The combination of claim 17 wherein the force results in a corresponding force on the tracking assembly resulting in a variance in the output from the sensor, the variance in output received by the counter.

19. The combination of claim 17 wherein the body is embedded within a bore defined in the tool or the tool assembly, the bore vertically oriented and parallel to an axis along which the force is applied.

20. The combination of claim 19 wherein the electronic devices are potted within the bore.

* * * * *